(12) United States Patent  
Amin et al.

(10) Patent No.: US 8,286,333 B2
(45) Date of Patent: Oct. 16, 2012

(54) METHOD OF MANUFACTURING A MAGNETIC HEAD

(75) Inventors: Nurul Amin, Woodbury, MN (US); Ibro Tabakovic, Edina, MN (US); Eric S. Linville, Shakopee, MN (US); Ming Sun, Eden Prairie, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 1023 days.

(21) Appl. No.: 12/051,332

(22) Filed: Mar. 19, 2008

(65) Prior Publication Data

US 2009/0237837 A1    Sep. 24, 2009

(51) Int. Cl.
*G11B 5/127*  (2006.01)
*H04R 31/00*  (2006.01)

(52) U.S. Cl. ............... 29/603.13; 29/603.14; 29/603.15; 29/603.16; 29/603.18; 360/121; 360/122; 360/317; 427/127; 427/128

(58) Field of Classification Search ............... 29/603.07, 29/603.13–603.16, 603.18; 360/121, 122, 360/317, 324–327; 427/127, 128; 451/5, 451/41

See application file for complete search history.

(56) References Cited

U.S. PATENT DOCUMENTS

| | | | |
|---|---|---|---|
| 4,839,197 A | 6/1989 | Henderson | |
| 6,665,136 B2 | 12/2003 | Clinton et al. | |
| 6,765,768 B2 | 7/2004 | Saito | |
| 6,775,099 B2 | 8/2004 | Kuroda et al. | |
| 6,950,280 B2 | 9/2005 | Rea et al. | |
| 7,023,658 B1 * | 4/2006 | Knapp et al. | 360/125.56 |
| 7,088,560 B2 | 8/2006 | Kudo et al. | |
| 7,149,055 B2 | 12/2006 | Clinton et al. | |
| 7,212,367 B2 | 5/2007 | Clinton et | |
| 2002/0154451 A1 * | 10/2002 | Dimitrov et al. | 360/317 |
| 2006/0132971 A1 | 6/2006 | Clinton et al. | |
| 2007/0036040 A1 | 2/2007 | Mihalcea et al. | |

OTHER PUBLICATIONS

Permeability (electromagnetism), 7 pages; http://en.wikipedia.org/wiki/permeability_(electromagnetism), Jan. 3, 2012.
Permalloy-Magnetic Field Shieling, E-Song America, Inc., Campbel, CA, 3 pages.
Lide, David R., Editor-In-Chief, "Handbook of Chemistry and Physics", $72^{nd}$ Edition, 1991-1992, Special Student Edition, "Magnetic Susceptibility of the Elements and Inorganic Compounds", pp. 9-33-9-37.

* cited by examiner

*Primary Examiner* — Paul D Kim
(74) *Attorney, Agent, or Firm* — Mueting Raasch & Gebhardt PA

(57) ABSTRACT

A method of fabricating a recording head includes depositing an insulator material onto at least a portion of a first member, wherein the insulator material forms an insulator film having a film thickness. The method further includes depositing a writer pole material onto the insulator film, wherein the writer pole material forms a writer pole member, and wherein the insulator film is between the writer pole member and a contact layer. Further, in some embodiments, the film thickness determines the distance between the writer pole member and the first contact member and also determines the distance between the writer pole member and the second contact member.

14 Claims, 15 Drawing Sheets

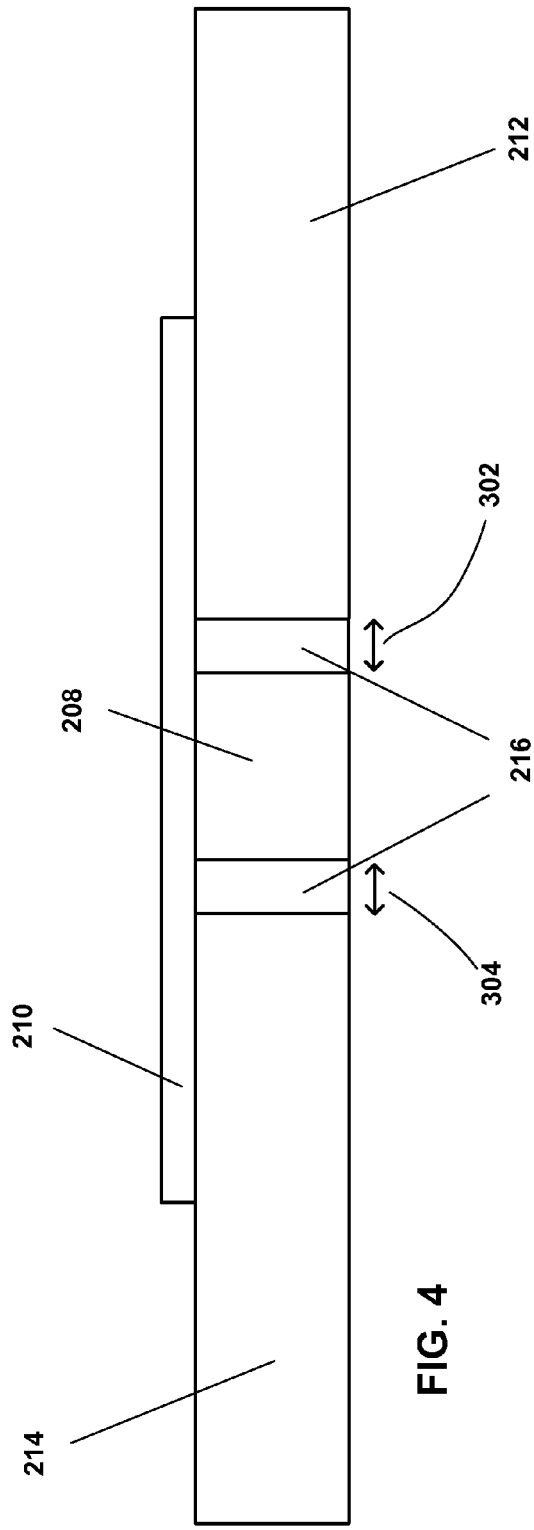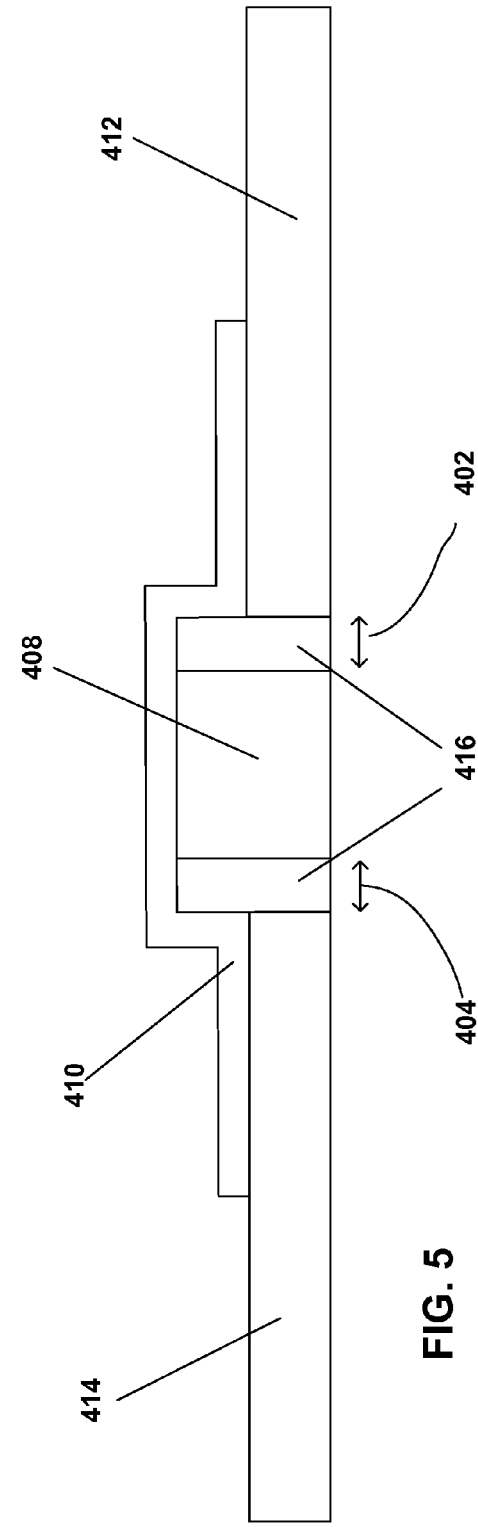

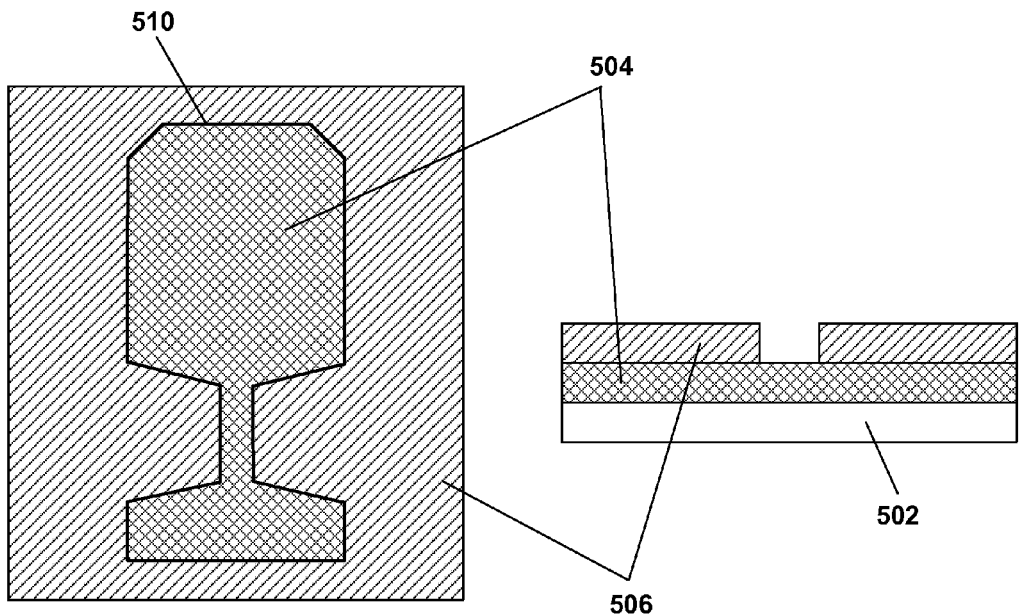
FIG. 6A     FIG. 6B
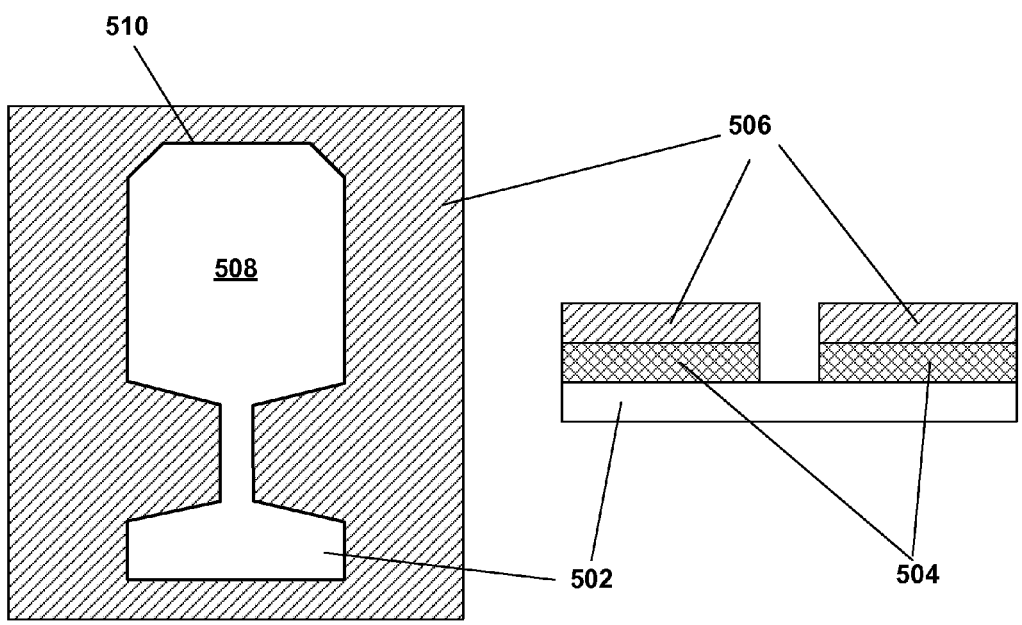
FIG. 7A     FIG. 7B

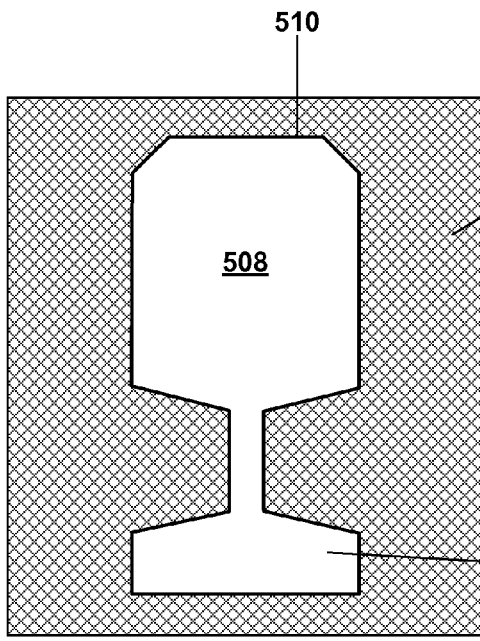
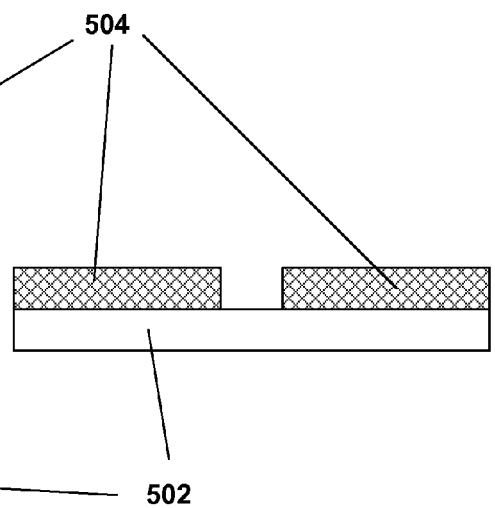
FIG. 8A  FIG. 8B
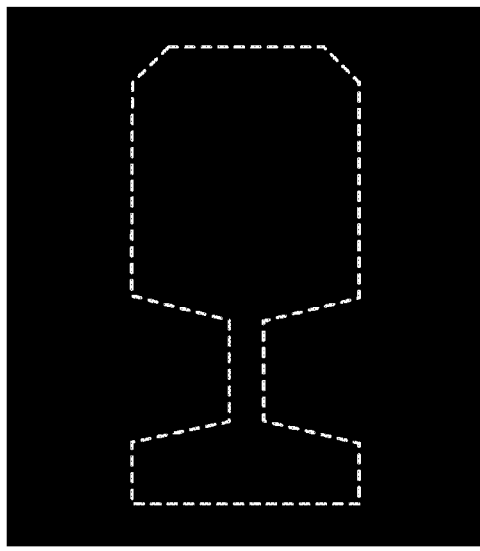
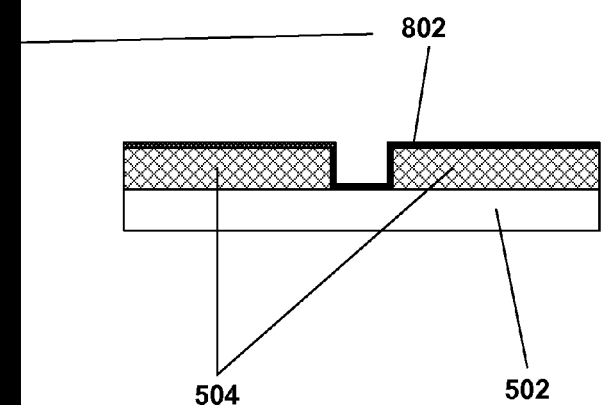
FIG. 9A  FIG. 9B

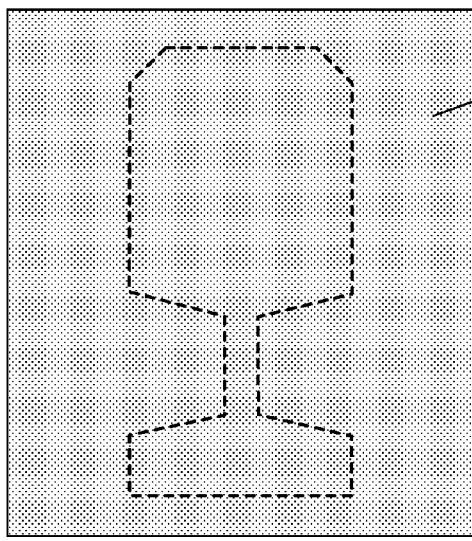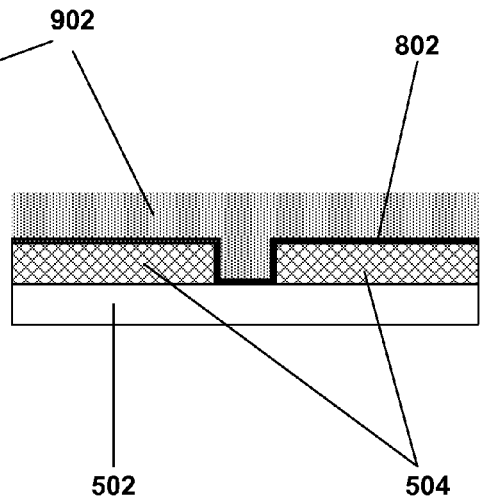
FIG. 10A        FIG. 10B
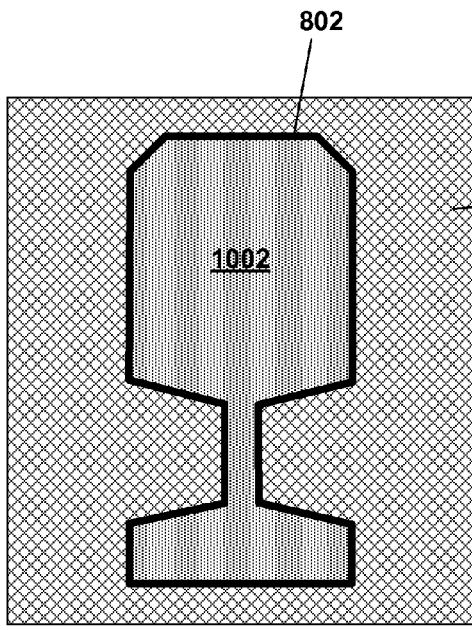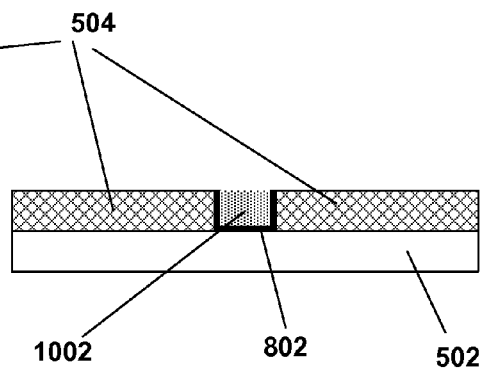
FIG. 11A        FIG. 11B

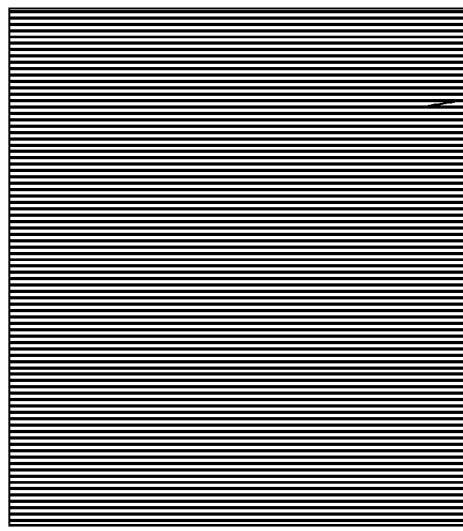
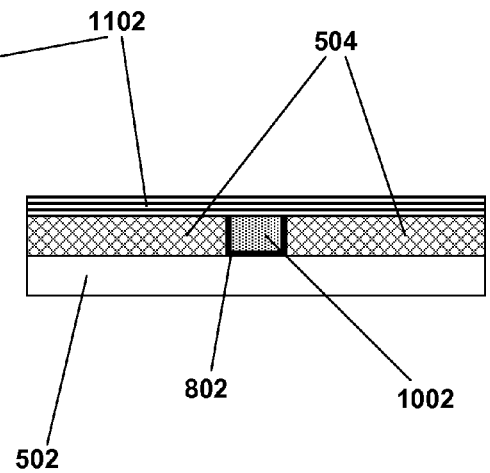
FIG. 12A  FIG. 12B
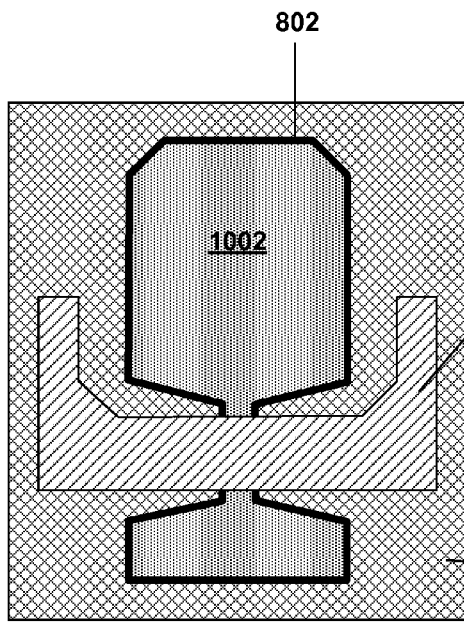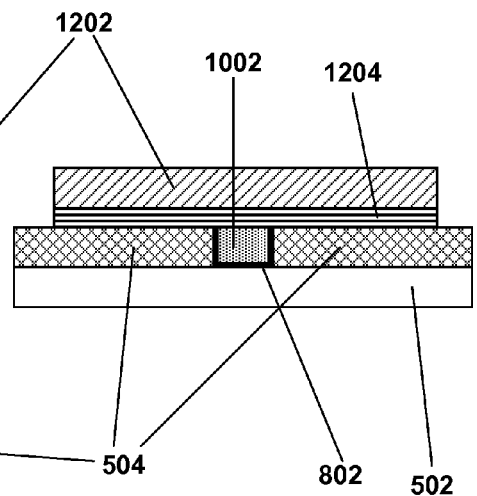
FIG. 13A  FIG. 13B

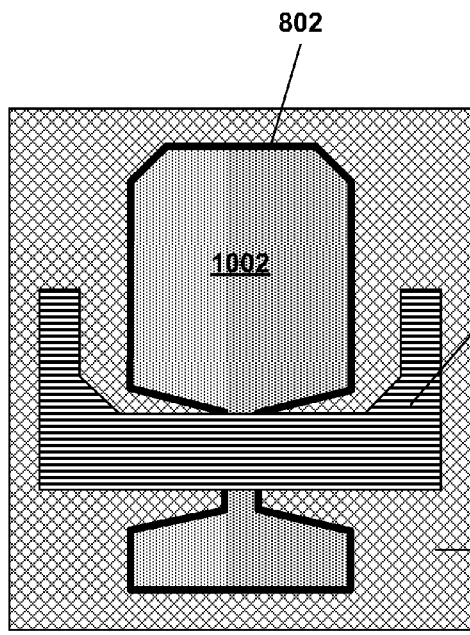
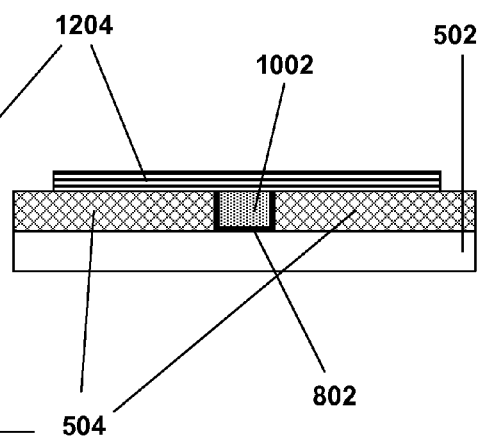
FIG. 14A  FIG. 14B
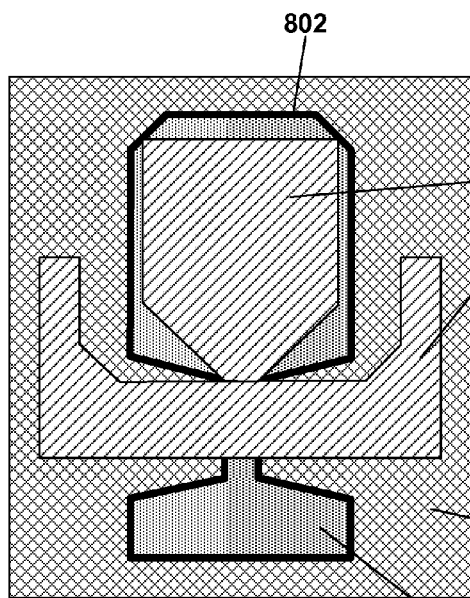
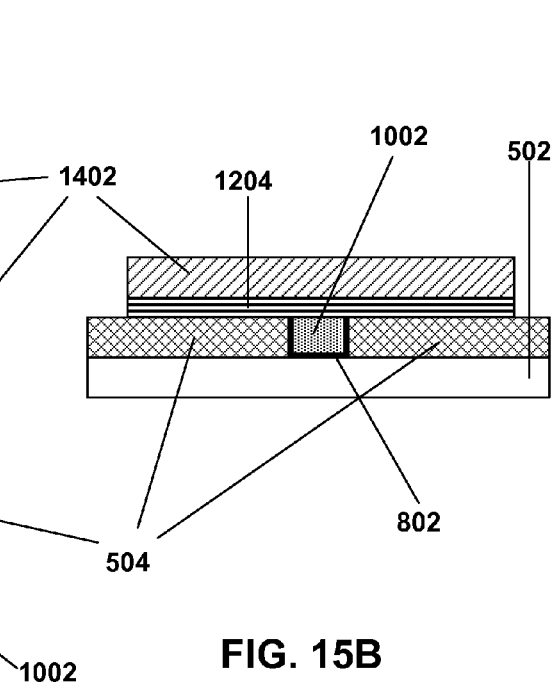
FIG. 15A  FIG. 15B

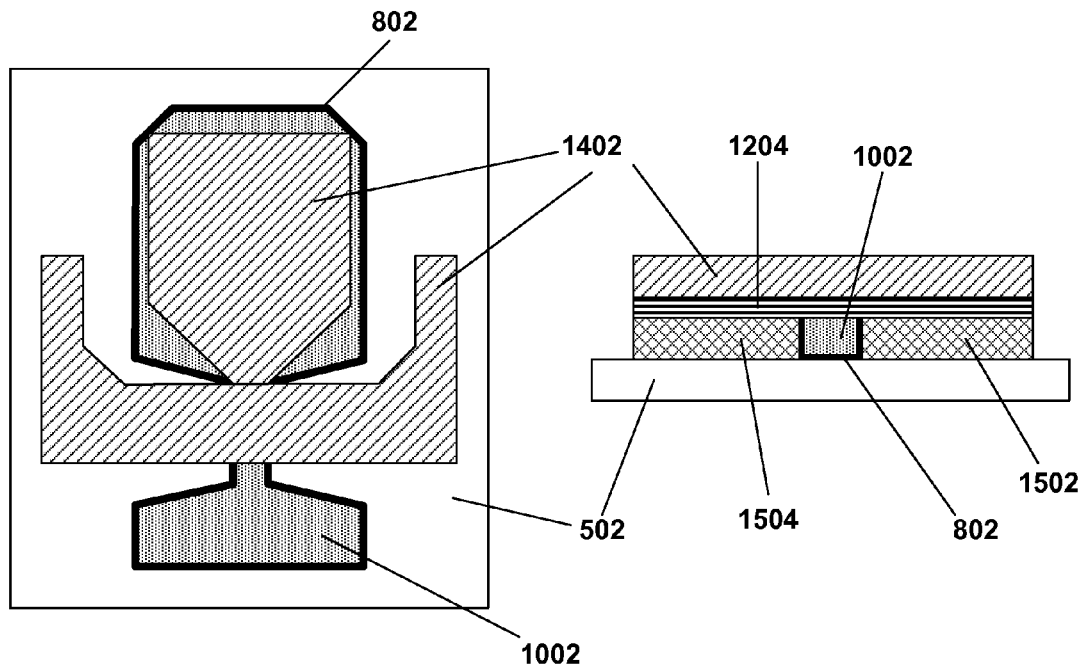
FIG. 16A  FIG. 16B
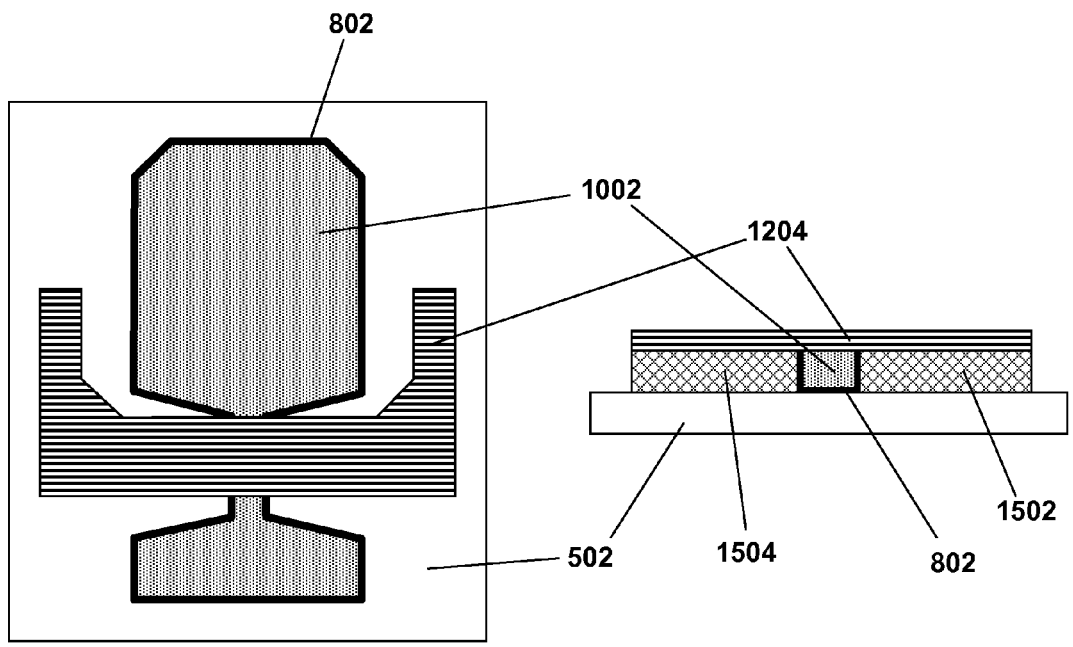
FIG. 17A  FIG. 17B

METHOD OF MANUFACTURING A MAGNETIC HEAD

BACKGROUND

Magnetic storage devices, such as magnetic disc drives, generally include magnetic recording heads and magnetic storage media. The magnetic recording heads (which perform both reading and writing functions) detect and modify the magnetic properties of the magnetic storage media in a data storage device.

A magnetic write head utilizes a magnetic write field coupled to a writer pole member located in the write head to orient a magnetic storage media to a readable state. To aid in the writing function, a magnetic write head may include a current carrying wire lead, which creates a magnetic field when current passes through the wire lead.

SUMMARY

Supplying current through a wire lead to create an electromagnetic field may result in excessive heat generation and power consumption. For example, generated heat may build up in a closed environment and adversely affect the reliability of a magnetic storage device.

In one aspect, the present disclosure is directed to a method of fabricating a recording head, which includes depositing an insulator material onto at least a portion of a first member, wherein the insulator material forms an insulator film having a film thickness. The method further includes depositing a writer pole material onto the insulator film, wherein the writer pole material forms a writer pole member, wherein the insulator film is between the writer pole member and a contact layer.

The details of one or more embodiments of the invention are set forth in the accompanying drawings and the description below. Other features, objects, and advantages of the invention will be apparent from the description and drawings, and from the claims.

BRIEF DESCRIPTION OF DRAWINGS

FIG. 4 is a cross sectional view of the exemplary magnetic write head of the exemplary magnetic recording head of FIG. 3A.

FIG. 5 is a cross sectional view of an exemplary magnetic write head having a partially wrapped configuration.

FIG. 6A through FIG. 17A are plan view illustrations of an exemplary method of fabricating a magnetic recording head according to one aspect of the present invention.

FIG. 6B through FIG. 17B are cross sectional views of FIG. 6A through FIG. 17A, respectively.

FIG. 18A through FIG. 24A are plan view illustrations of an exemplary method of fabricating a magnetic recording head including a partially wrapped writer pole member according to one aspect of the present invention.

FIG. 18B through FIG. 24B are cross sectional views of FIG. 18A through FIG. 24A, respectively.

DETAILED DESCRIPTION

In general, the disclosure is related to magnetic recording heads. Suitable magnetic recording heads can include, but are not limited to, longitudinal and perpendicular magnetic recording heads and the like. The magnetic recording head can include a device, such as a magnetic write head, which performs at least part of the writing function. Some magnetic write heads, for example, Wire Assisted Magnetic Recording (WAMR) heads, may include a current carrying wire lead that creates an electromagnetic field to aid in the writing function. Such devices may include a wire lead and two contact members adjacent to a writer pole member. In some arrangements, the wire lead is coupled to both contact members, such that the length of the wire lead spans the writer pole member and an electric current can be sent through the wire lead to create an electromagnetic field to aid in the writing function.

In a device that includes a current carrying wire lead, such as, for example, a WAMR head, the creation of an electromagnetic filed typically requires a relatively high current through the wire lead, which may result in relatively high power consumption and heat generation. In general, heat generated due to current through a wire lead can accumulate in a device containing a magnetic recording head, such as a magnetic disc drive, and adversely affect the reliability and performance of the device. Consequently, it is desirable to optimize the power consumption and minimize the heat generation associated with magnetic recording heads.

Figure 1:
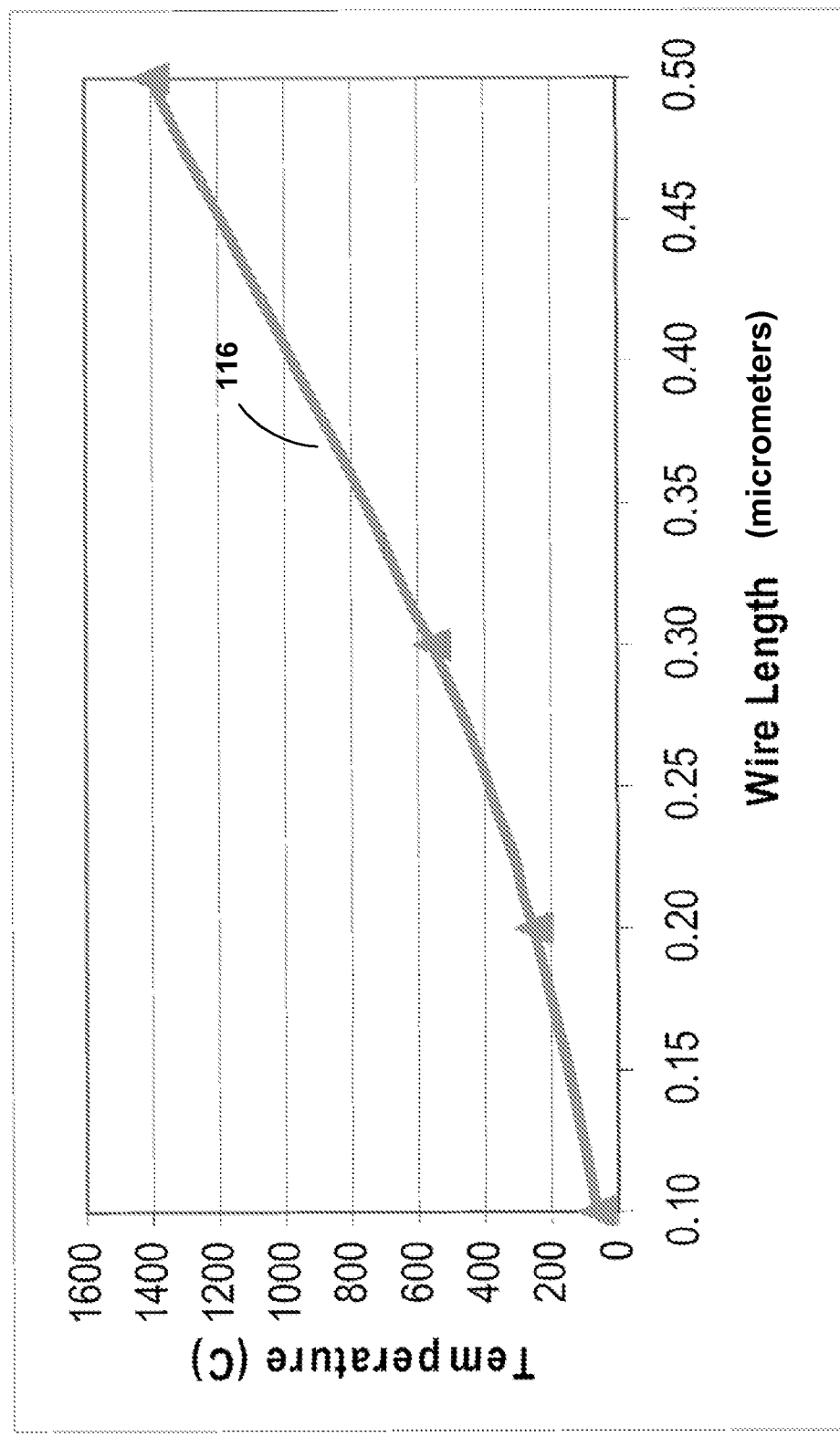
FIG. 1 is a representative plot of wire temperature as a function of wire length of an exemplary magnetic recording head.

FIG. 1 is a representative plot of wire temperature as a function of wire length in an exemplary WAMR head. The results plotted in FIG. 1 were gathered from a computer modeling using finite elements analysis software. In the computer model of the exemplary WAMR head, wire thickness was set at 0.1 micrometers, wire width was set at 0.1 micrometers, thickness of the respective contact members was set at 0.5 micrometers and current density was held constant. Temperature of the wire was then calculated by the finite elements analysis software as the length of the wire was varied between 0.10 micrometer and 0.50 micrometers. The results of the analysis are represented by line 102 which illustrates that wire temperature increases substantially as the length of the wire increases from 0.10 micrometers to 0.50 micrometers.

In one aspect, the present disclosure is related to a device including a writer pole member; a first contact member adjacent to the writer pole member; a second contact member adjacent to the writer pole member; a wire lead adjacent to the writer pole member, wherein the wire lead is in contact with the first contact member and the second contact member; and an insulator layer having a film thickness, wherein the insulator layer is between the writer pole member and the first contact member, wherein the insulator layer is also between the writer pole member and the second contact member.

Figure 2:
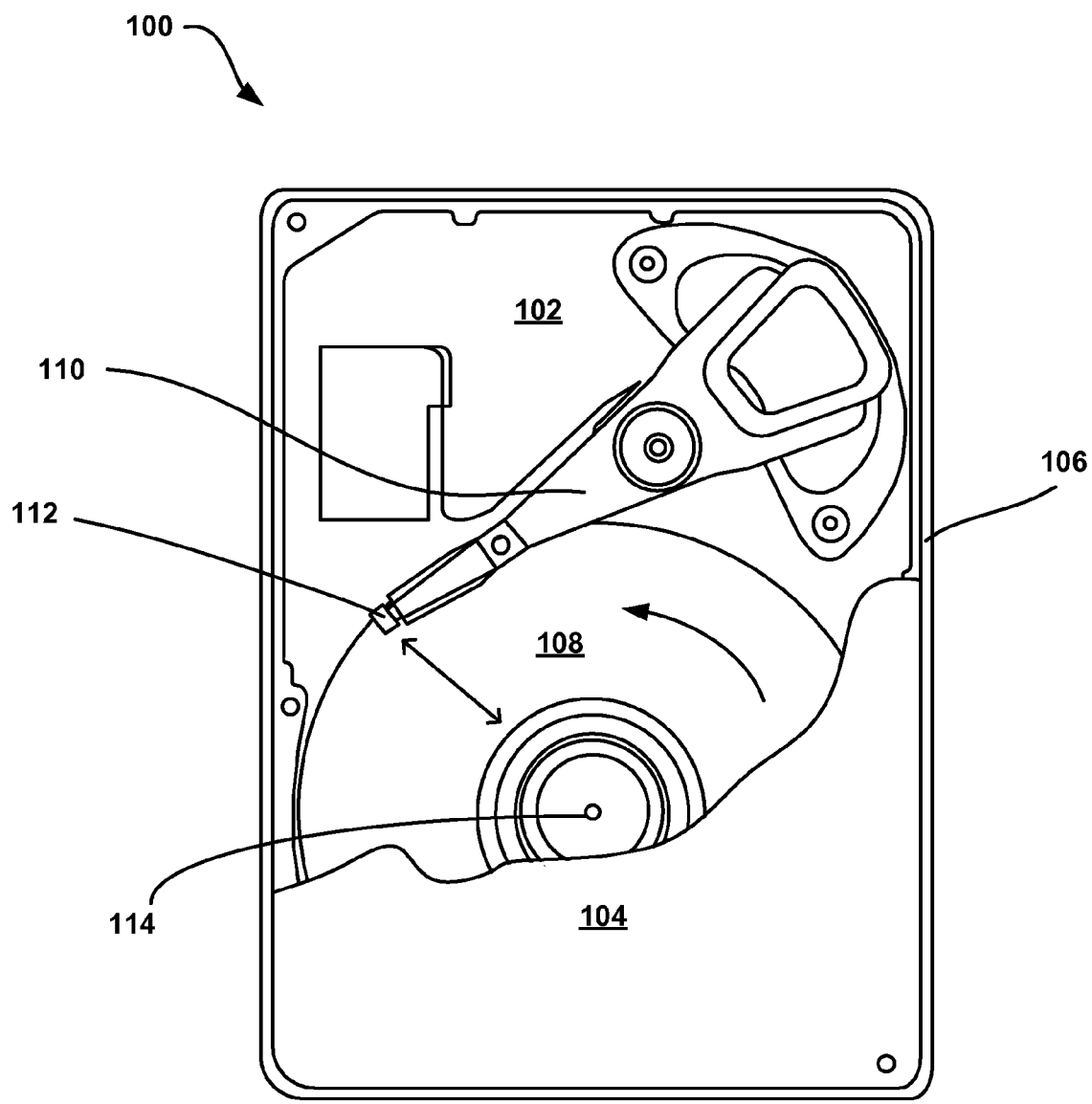
FIG. 2 is an illustration of an exemplary disc drive including an exemplary magnetic recording head according to one aspect of the present invention.

FIG. 2 illustrates an exemplary magnetic disc drive 100 including a magnetic recording head according to one aspect of the present invention. Disc drive 100 includes base 102 and top cover 104, shown partially cut away. Base 102 combines with top cover 104 to form the housing 106 of disc drive 100. Disc drive 100 also includes one or more rotatable magnetic data discs 108. Data discs 108 are attached to spindle 114, which operates to rotate discs 108 about a central axis. Magnetic recording head 112 is adjacent to data discs 108. Actuator arm 110 carries magnetic recording head 112 for communication with each of the data discs 108.

Figure 3A:
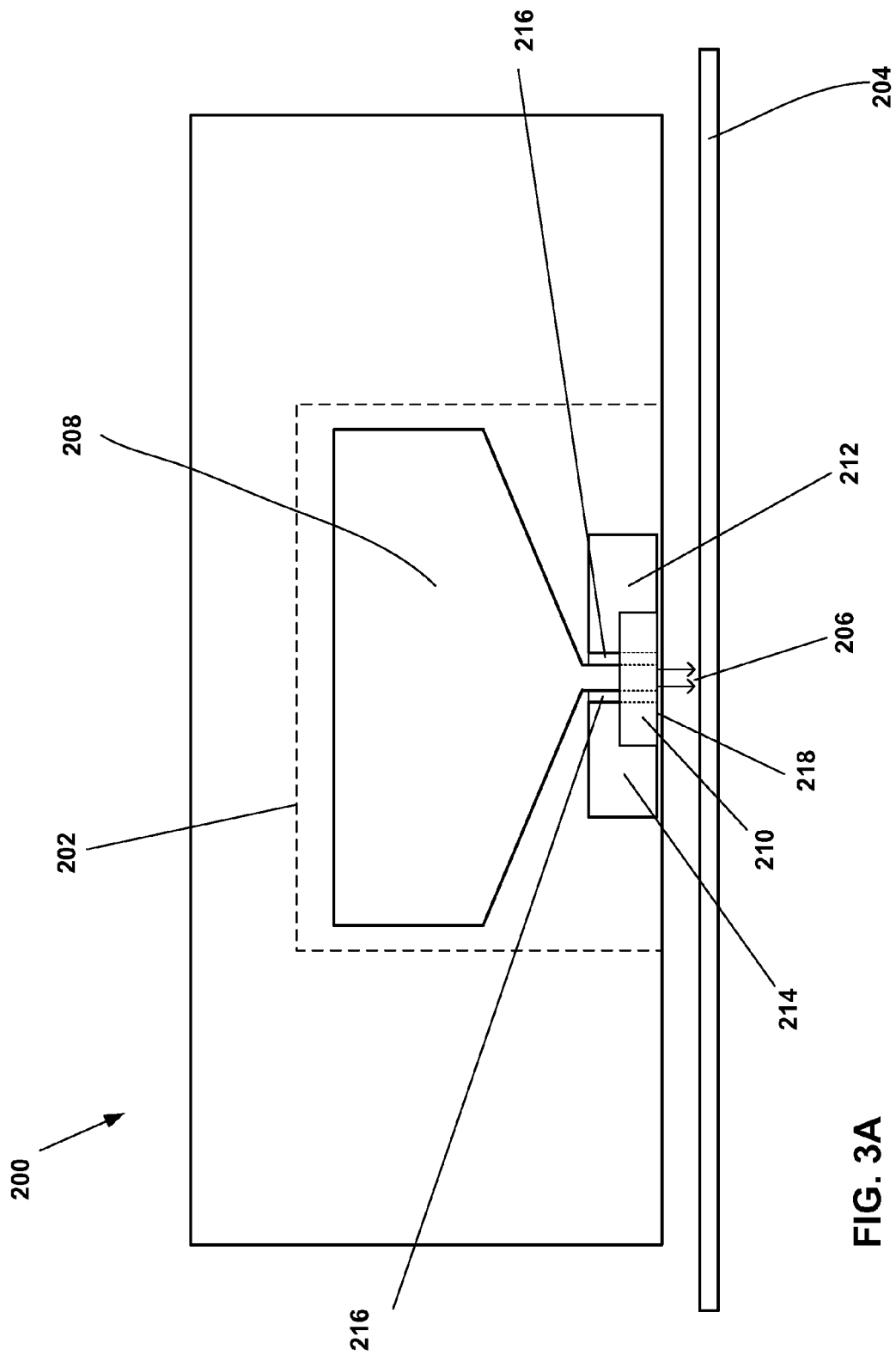
FIG. 3A is an illustration of an exemplary magnetic recording head including a magnetic write head according to one aspect of the present invention.

FIG. 3A illustrates an exemplary magnetic recording head 200 including a magnetic write head 202 according to one aspect of the present invention. Recording head 200 floats adjacent to the air bearing surface of data disc 204. Recording head 200 includes magnetic write head 202. Magnetic write head 202 includes writer pole member 208, wire lead 210, insulator film 216, first contact member 212, and second contact member 214. Wire lead 210, first contact 212 and second contact 214 are adjacent to writer pole member 208. Wire lead 210 is in contact with both first contact member 212 and second contact member 214 such that wire layer 210 spans writer pole member 208. Insulator film 216 is between writer pole member 208 and first contact member 212 and also between writer pole member 208 and second contact member 214. A magnetic write field, represented by arrows 206, out of the tip of magnetic write head 202 interacts with data disc 204 to orientate data disc 204 to a readable form. The direction of the magnetic write field may vary depending on a number of variables including, for example, the polarity of the bits written on the magnetic storage media, and is not limited to the direction represented by arrows 206. In some embodiments, the magnetic write field may be into the tip of magnetic write head 202.

In some embodiments a contact member may be in contact with a wire lead. For example, as stated above, first contact member 212 is in contact with wire lead 210. In general, a contact member may be considered to be in contact with a wire lead if the configuration allows for a current to flow through the wire lead to the respective contact member.

Figure 3B:
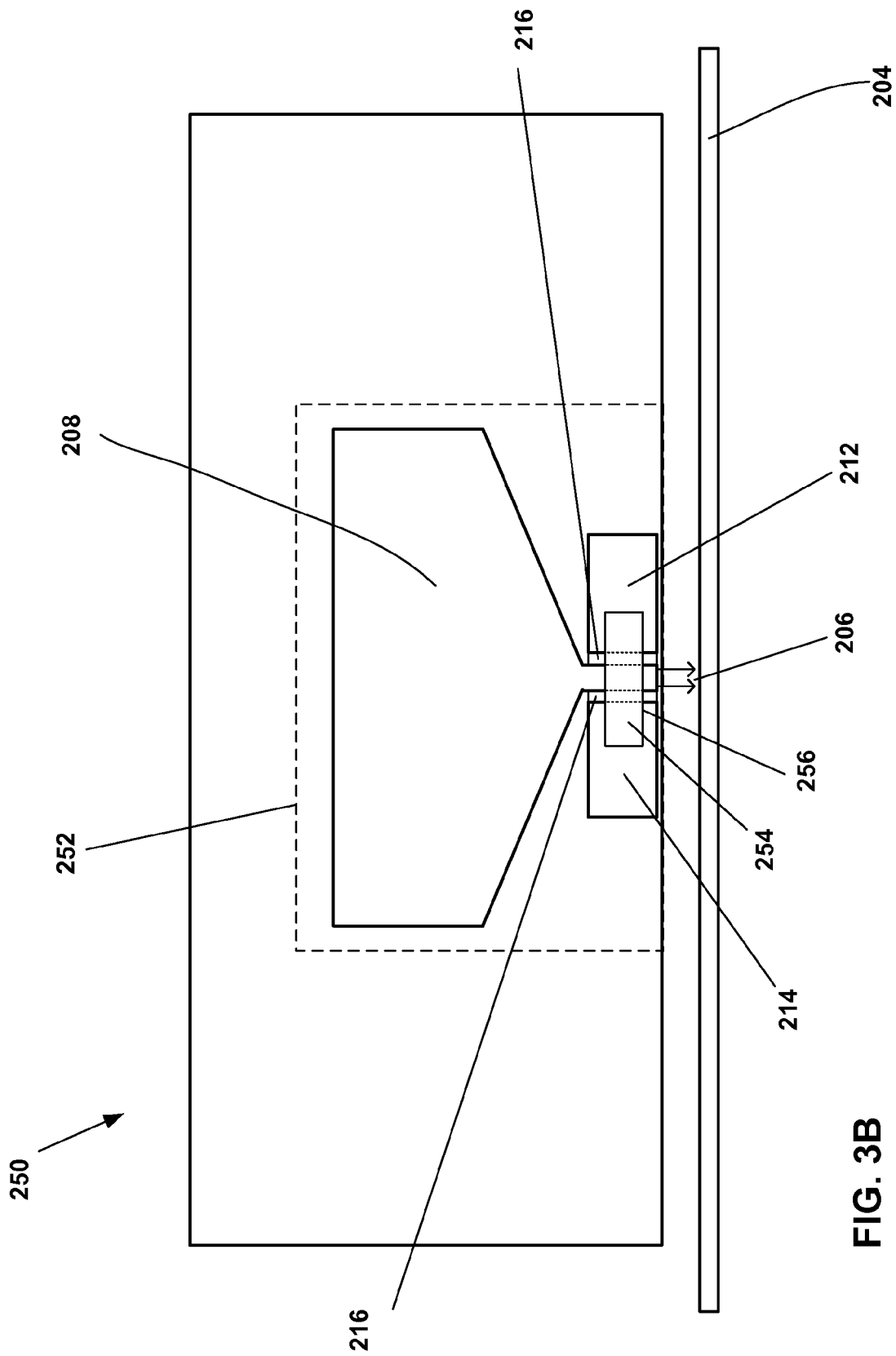
FIG. 3B is an illustration of another exemplary magnetic recording head including a magnetic write head according to one aspect of the present invention.

Positioning of a wire lead on magnetic write head may vary in embodiments of the present invention. For example, as illustrated in FIG. 3A, edge 218 of wire lead 210 is positioned to allow for edge 218 to float adjacent to the air bearing surface of data disc 204 at a height equal to that of the tip of magnetic write head 202. FIG. 3B illustrates another exemplary magnetic recording head 250 including a magnetic write head 252. Magnetic recording head 250 is configured the same as magnetic recording head 200 of FIG. 3A except that edge 256 of wire lead 254 is positioned to allow for edge 256 to float adjacent to the air bearing surface of data disc 204 at a height greater than that of the tip of magnetic write head 202.

FIG. 4 is a cross sectional view of the exemplary magnetic write head 202 of the magnetic recording head 200 of FIG. 3A. Wire lead 210, first contact 212 and second contact 214 are adjacent to writer pole member 208. Wire lead 210 is in contact with both first contact member 212 and second contact member 214 such that wire lead 210 spans writer pole member 208. As configured, current is allowed to flow across contact members 212, 214 through wire lead 210. Insulator film 216 is between writer pole member 208 and first contact member 212 and also between writer pole member 208 and second contact member 214. In some embodiments, wire lead 210 is configured to carry electrical current between first contact member 212 and second contact member 214, such that the current induces a magnetic field to aid the writer pole member in orienting a magnetic storage medium (e.g., a data disc). For instance, a data disc may be oriented by the induced magnetic field to a readable state.

In some embodiments, as shown in FIG. 4, for example, writer pole member 208 may be in contact with wire lead 210, provided that writer pole member 208 has a relatively high resistance to allow for a relatively small amount of current to flow through writer pole 208. Instead, the majority of the current flow through contact members 212, 214. In other embodiments, writer pole member 208 is not in contact with wire lead and may be separated by a layer of insulator to prevent current flow through writer pole 208.

In general, the thickness of an insulator film may determine the distance (i.e. separation) between a writer pole member and a contact member. For example, as shown in FIG. 4, the thickness of insulator film 216 determines the distance 302 between first contact member 212 and writer pole member 208. The thickness of insulator film 216 also determines the distance 304 between second contact member 214 and writer pole member 208. The thickness of insulator film may be different depending on the desired distance between a pole member and contact member. For example, the thickness of insulator film 216 may be about 5 ångströms to 2 micrometers. In some embodiments, the thickness of a film may be less than about 1 micrometer.

In some aspects according to the present invention, it is advantageous to minimize the insulator film thickness as it results in a reduction of the distance between a writer pole member and contact member. For example, a reduction in distance between writer pole member 208 and first and second contact member 212, 214, respectively, may result in a reduction in the length of wire lead 210 used to create an electromagnetic field. Reducing the length of wire lead 210 may result in the reduction of heat generation and power consumption.

Thickness of an insulator film may also determine the alignment of writer pole member relative to first contact member and second contact member. In some embodiments, insulator film that has substantially uniform thickness may result in writer pole member being substantially equal distance from first contact member and second contact member. In some aspects, embodiments in which writer pole member is substantially equal distance from first contact member and second contact member may be preferred to embodiments in which writer pole member is not substantially equal distance from first contact member and second contact member. Other embodiments in which writer pole member is not substantially equal distance from first contact member and second contact member may be preferred to embodiments in which writer pole member is substantially equal distance from first contact member and second contact member.

In some embodiments, for example, as shown in FIG. 4, a surface of both contact members 212, 214 are on substantially the same plane as a surface of writer pole member 208. Additionally, wire lead 210 is substantially on the same plane as the surface of writer pole member 208 and contact members 212, 214. Wire lead 210 is also in contact with writer pole member 208 and both contact members 212, 214. In other embodiments, an insulator film may separate writer pole member and wire lead. In such embodiments, insulator film thickness may determine the distance of wire lead from write pole member.

In other embodiments according to the present invention, the configuration of a magnetic write head may differ from that of FIG. 4. For example, FIG. 5 is a cross sectional view of an exemplary magnetic write head having a partially wrapped configuration. As illustrated, wire lead 410, first contact 412 and second contact 414 are adjacent to writer pole member 408. Wire lead 410 is in contact with both first contact member 412 and second contact member 414 such that wire lead 410 spans writer pole member 408. Insulator film 416 is between writer pole member 408 and first contact member 412 and also between writer pole member 408 and second contact member 414. Surface of first contact 412 and second contact 414 are on a plane different from the plane defined by the surface of writer pole member 408. As shown, wire lead 410 is partially "wrapped" around at least a portion of writer pole 408 and is in contact with surface of first contact member 412 and second contact member 414. Insulator film 416 determines distance 404 and 402 between wire lead 410 and writer pole member 408 and contact members 412, 414 and writer pole member 408. Embodiments of the present invention exhibiting a partially wrapped configuration such as illustrated in FIG. 5, may have increased magnetic field through writer pole member because of the partially wrapped configuration.

In another aspect, the present disclosure is related to a method of fabricating a recording head including depositing an insulator material onto at least a portion of a first member, wherein the insulator material forms an insulator film having a film thickness. The method further includes depositing a writer pole material onto the insulator film, wherein the writer pole material forms a writer pole member, wherein the insulator film is between the writer pole member and a contact layer.

FIG. 6A through FIG. 17A are plan view illustrations of an exemplary method of fabricating a magnetic recording head according to one aspect of the present invention. FIG. 6B through FIG. 17B are cross sectional views of FIG. 6A through FIG. 17A, respectively.

Referring to FIG. 6A and FIG. 6B, contact material 504 is deposited on substrate 502. Mask 506 is deposited on contact material 504. As shown, mask 506 is deposited such that the surface area of contact material 504 not covered by mask 506 substantially forms writer pole member outline 510. Substrate 502 may include any wafer material typically used in magnetic recording head fabrication, such as, for example, a solid wafer. Contact material 504 may include any metal or other conductive material. For example, contact material 504 may include at least one of copper, gold or tantalum. Mask 506 material may include any masking material typically used in etch processes or, more specifically, chemical etching processes.

Referring to FIG. 7A and FIG. 7B, a portion of contact material 504 is removed, which is controlled by the disposition of mask 506. The removal process may include any known process, such as, for example, chemical etching or other process utilized in magnetic recording head fabrication. Area 508 of substrate 502 is exposed, generally determined by outline 510 defined by mask 506, by removing the portion contact material 504 not covered by mask 506.

Referring to FIG. 8A and FIG. 8B, mask 506 is removed. Substrate 502 and contact material 504 remain. The remaining contact material 504 defines the lateral boundary of a writer pole imprint on substrate 502 and area 508 of substrate 502 defines the lower boundary of the writer pole imprint.

Referring to FIG. 9A and FIG. 9B, insulator material 802 is deposited on a portion of the outer surface of contact material 504 and area 508 of substrate 502. Insulator material 802 forms an insulator film or layer 802 having a film thickness on the outer surface of contact material 504 and area 508 of substrate 502. Insulator material 802 is deposited such that the boundary of writer pole imprint defined by contact material 504 and area 508 remains substantially intact after the insulator film 802 is formed.

Embodiments of according to the present invention may include any number of insulator compositions to form the insulator film. For example, insulator compositions may include diamond like carbon; nitrides, such as, for example, aluminum nitride, silicon nitride; and oxides, such as, for example, aluminum oxide, silicon oxide. In some embodiments according to the present invention, an insulator composition that conducts heat relatively better than another composition may be preferred.

Insulator material 802 may be deposited by any known process to deposit a thin continuous layer of film. For example, insulator material 802 may be deposited by atomic layer deposition to form insulator film or layer 802. In general, atomic layer deposition may deposit continuous films as thin as about ten ångströms but may vary depending on the composition of material deposited.

As stated before, the thickness of an insulator film may determine the distance between a pole member and contact member. As such, for example, insulator material 802 may be deposited to result in a film thickness equal to that of the distance desired between a pole member and contract member. For example, in some embodiments, an insulator material may be deposited to result in a film thickness between about 5 ångströms to about 2 micrometers. In some embodiments, an insulator film may be deposited to result in a film thickness of less than about 1 micrometer.

Referring to FIG. 10A and FIG. 10B, magnetic writer pole material 902 is deposited on the surface of insulator film 802 to form writer pole layer 902. As shown, writer pole material 902 is deposited such that the material 902 occupies a volume defined in part by the writer pole imprint. Writer pole material 902 may be deposited by any known process suitable for such deposition. In some embodiments, writer pole material 902 may be deposited by a physical vapor deposition, such as, for example, sputter deposition or sputter plating.

Referring to FIG. 11A and FIG. 11B, a portion of writer pole material 902 is removed such that the remaining writer pole material 902 substantially forms writer pole member 1002. As shown, a portion of writer pole material 902 and a portion of insulator film 802 have been removed to exposed contact layer 504. Exposed surface of writer pole member 1002, contact layer 504 and insulator film 802 form a substantially uniform plane. The portion of writer pole material 902 and insulator film 504 can be removed by a process such as planarization. For example, chemical mechanical planarization (CMP). Insulator film 802 separates writer pole member 1002 from contact layer 504. Thickness of insulator film 802 determines the distance between writer pole member 1002 and contact layer 504. An insulator film that is deposited at a substantially uniform thickness may result in a writer pole member being substantially equal distance from a first contact member and a second contact member.

Referring to FIG. 12A and FIG. 12B, wire material 1102 is deposited on the exposed surface of writer pole member 1002, insulator film 802, and contact layer 504. Deposited wire material 1102 forms wire layer 1102. In general, wire material may include any highly conducting material that does not significantly degrade over time under the stress of high electric currents. For example, wire material 1102 may include copper, gold, tantalum or tungsten. In some embodiments, the material includes any wire material generally used to form the current carrying wire in WAMR heads. Wire layer 1102 is on a plane that is substantially the same as the plane formed by the surface of writer pole member 1002, contact layer 504 and insulator layer 802.

Referring to FIG. 13A and FIG. 13B, mask 1202 is deposited on a portion of the surface of wire layer 1102. Mask 1202 is deposited on a particular area to protect the portion of wire layer 1102 to form desired features of wire lead 1204. Wire material 1102 is removed except the portion protected by mask 1202. The portion of wire material 1102 remaining after removal process forms wire lead 1204. The removal process may include a process such as chemical etching, sputter etching, ion mill process or any other process utilized in magnetic recording head fabrication.

Referring to FIG. 14A and FIG. 14B, mask 1202 is removed to expose surface of wire lead 1204. Mask 1202 may be removed using any known process to remove mask material.

Referring to FIG. 15A and FIG. 15B, mask 1402 is deposited onto at least a portion of the surface of wire lead 1204, and writer pole member 1002.

Referring to FIG. 16A and FIG. 16B, contact material 504 not protected by applied masking is removed. Contact material may be removed by any known process. For example, removed by chemical etching, sputter etching or ion mill process. Remaining contact material 504 may include first contact member 1501 and second contact member 1502.

Referring to FIG. 17A and FIG. 17B, mask 1402 is removed to expose at least portions of the surface of writer pole member 1002 and wire lead 1204.

In some embodiments, a method of fabricating a magnetic recording head allows for a configuration in which a wire lead is partially "wrapped" around a portion of a writer pole member. For example, a method of fabricating an embodiment with a configuration such as the exemplary magnetic write head illustrated in FIG. 5.

FIG. 18A through FIG. 24A are plan view illustrations of an exemplary method of fabricating a magnetic recording head including a partially "wrapped" writer pole member according to one aspect of the present invention. FIG. 18B through FIG. 24B are cross sectional views of FIG. 18A through FIG. 24A, respectively.

Figures 18A, 18B:
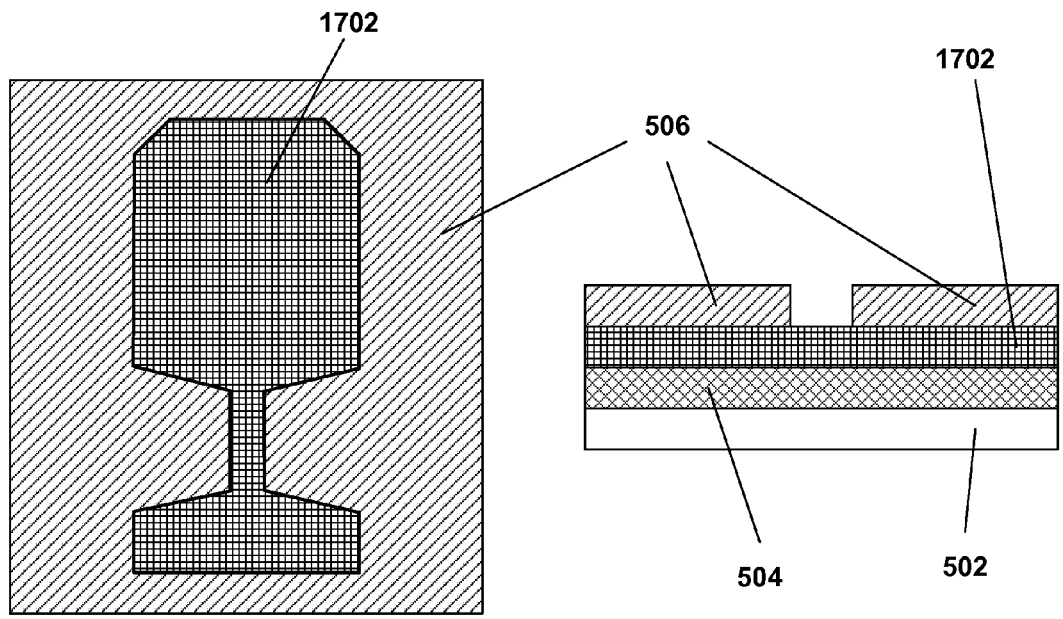

Referring to FIG. 18A and FIG. 18B, first contact material 504 is deposited on substrate 502. Second contact material 1702 is deposited on first contact material 504. Mask 506 is deposited on second contact material 1702. As shown, mask 506 is deposited such that the surface area of second contact material 1702 not covered by mask 506 substantially forms writer pole member outline 510. Substrate 502 may include any wafer material typically used in magnetic recording head fabrication. First contact material 504 and second contact material may include any metal or other solid conductive material. For example, first contact material 504 may include at least one of copper, gold or tantalum and second contact materiel may include at least on of copper, gold or tantalum. More specifically, for example, first contact material 504 may be gold and second contact material may be copper. Mask 506 material may include any masking material (e.g. metal, oxide or polymer) typically used in magnetic recording head fabrication or, more specifically, chemical etching processes.

Figures 19A, 19B:
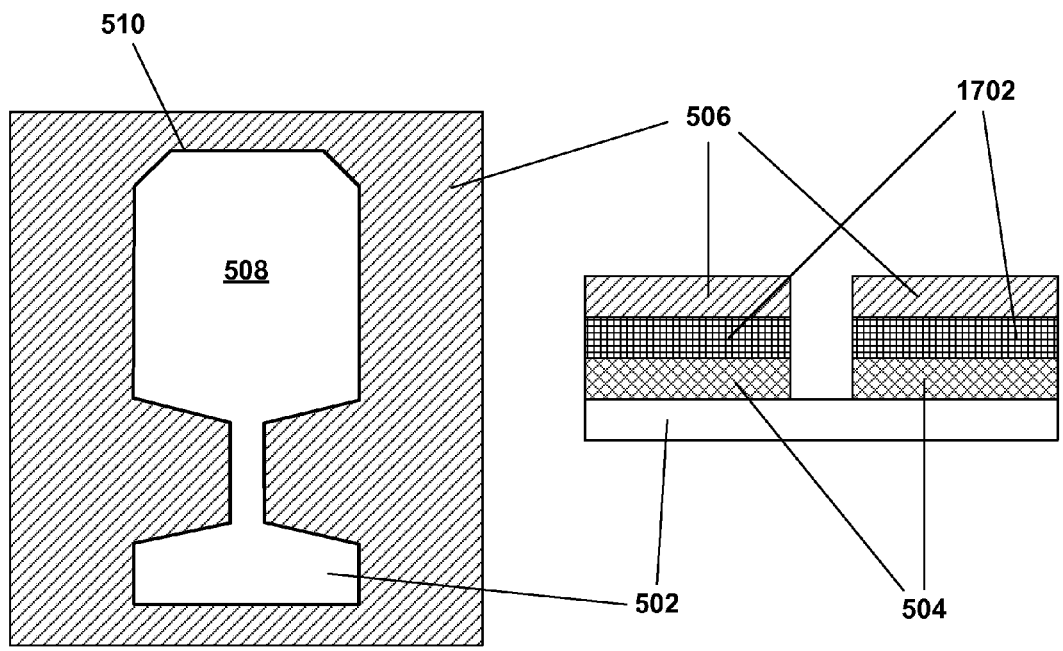

Referring to FIG. 19A and FIG. 19B, a portion of first contact material 504 and a portion of second contact material 1702 are removed, which is controlled by the disposition of mask 506. The removal process may include any known process, such as, for example, chemical etching or other process utilized in magnetic recording head fabrication. An area 508 of substrate 502 is exposed, generally determined by outline 510 defined by mask 506, by removing the portion of first contact material 504 and the portion of second contact material 1702 not covered by mask 506.

Figure 20A:
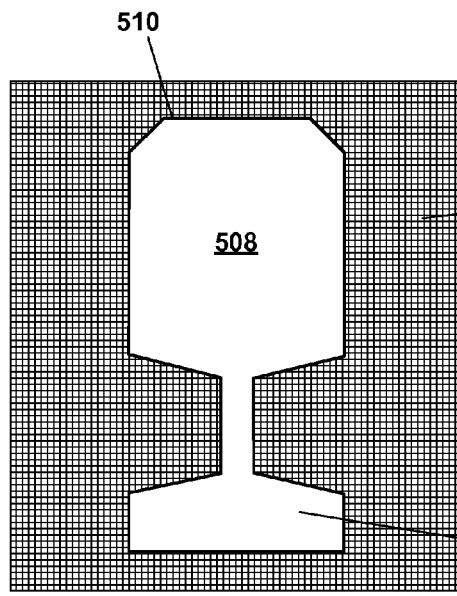
Figure 20B:
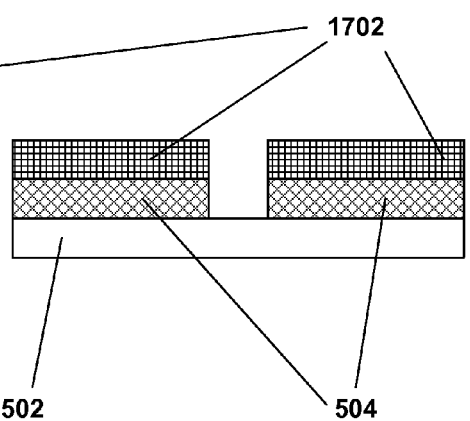

Referring to FIG. 20A and FIG. 20B, mask 506 is removed. Substrate 502, first contact material 504 and second contact material 1702 remain. The remaining first contact material 504 and second contact material 1702 define the lateral boundary of a writer pole imprint on substrate 502 and area 508 of wafer defines the lower boundary of the writer pole imprint.

Figure 21A:
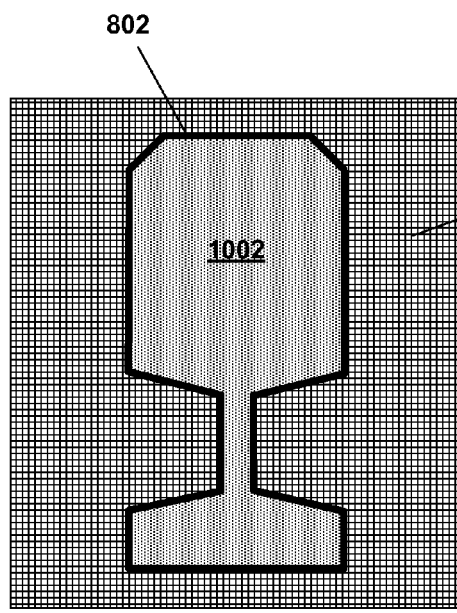
Figure 21B:
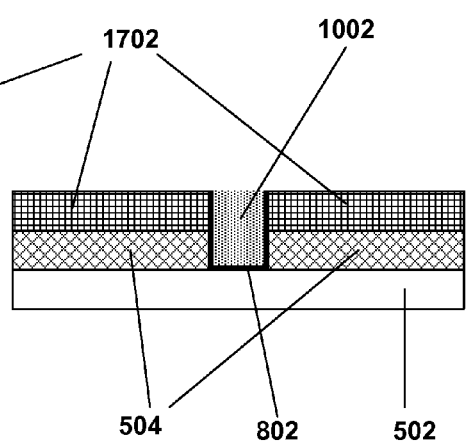

Referring to FIG. 21A and FIG. 21B, insulator film 802 separates writer pole member 1002 from first contact layer 504 and second contact layer 1702, respectively. Thickness of insulator film 802 determines the distance between writer pole member 1002 and first contact layer 504 and second contact layer 1702, respectively. Insulator film 802 and writer pole member 1002 may be deposited, for example, by a process such as illustrated by FIG. 9A and FIG. 9B through FIG. 11A and FIG. 11B.

Figure 22A:
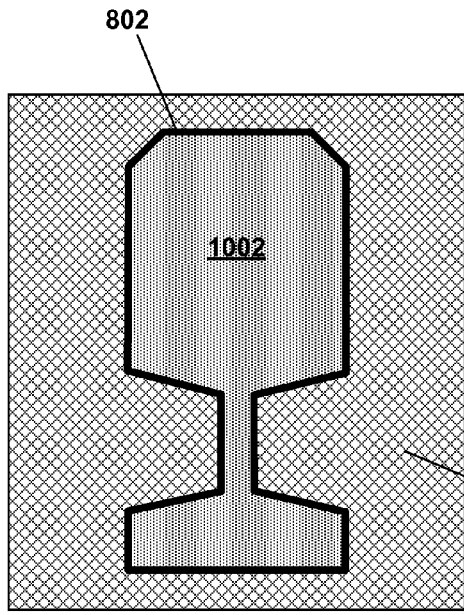
Figure 22B:
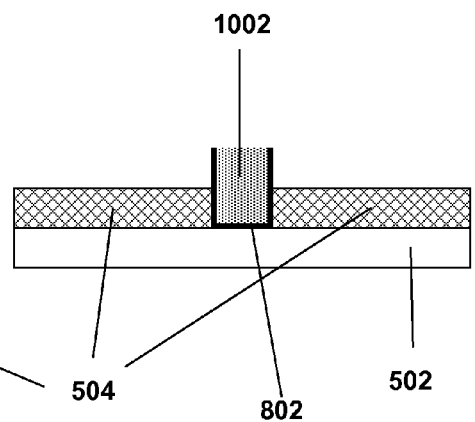

Referring to FIGS. 22A and 22B, second contact layer 1702 is selectively removed to exposed surface of first contact layer 504. Second contact layer 1702 is removed by any known process, such as, for example, chemical etching.

Figure 23A:
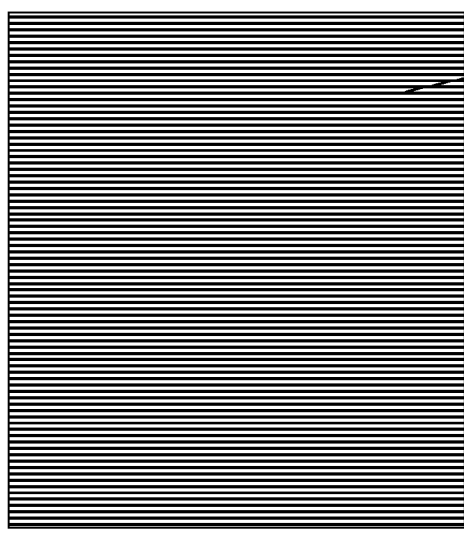
Figure 23B:
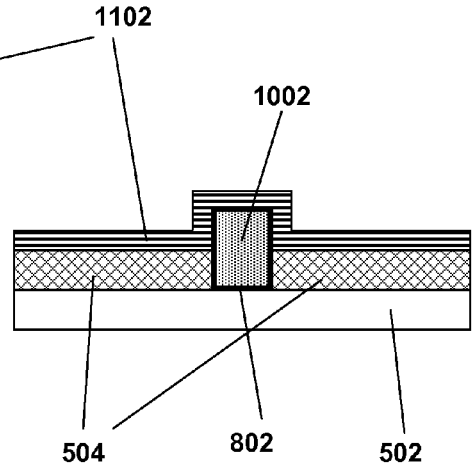

Referring to FIGS. 23A and 23B, wire material 1102 is deposited on the exposed surface of writer pole member 1002, insulator film 802, and first contact layer 504. Deposited wire material 1102 forms wire layer 1102. As described before, wire material may include any highly conducting material that does not significantly degrade over time under the stress of high electric currents. For example, wire material 1102 may include copper, gold, tantalum or tungsten. In some embodiments, the material includes any wire material generally used to form the current carrying wire in wire assisted magnetic recording (WAMR) heads.

As shown in FIG. 23B, surface of first contact layer 504 is on a plane different from the plane defined by the surface of writer pole member 1002. After wire material is deposited, wire layer 1102 is partially "wrapped" around at least a portion of writer pole member 1002 and is in contact with surface of first contact layer 504. Insulator film 802 determines the distance between wire layer 1102 and writer pole member 1002 and also the distance between first contact layer 504 and writer pole member 1002.

Figure 24A:
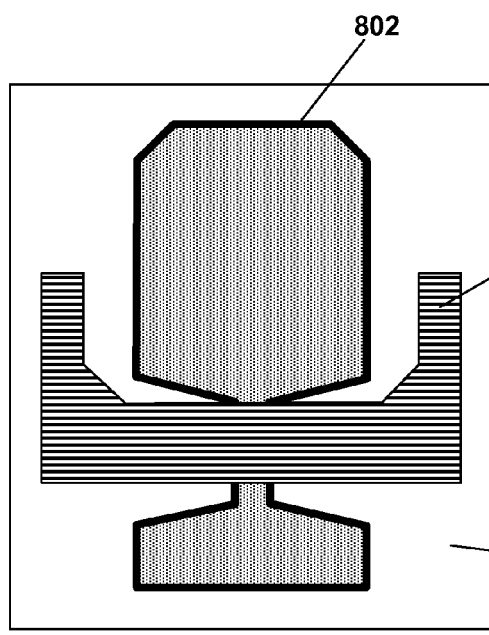
Figure 24B:
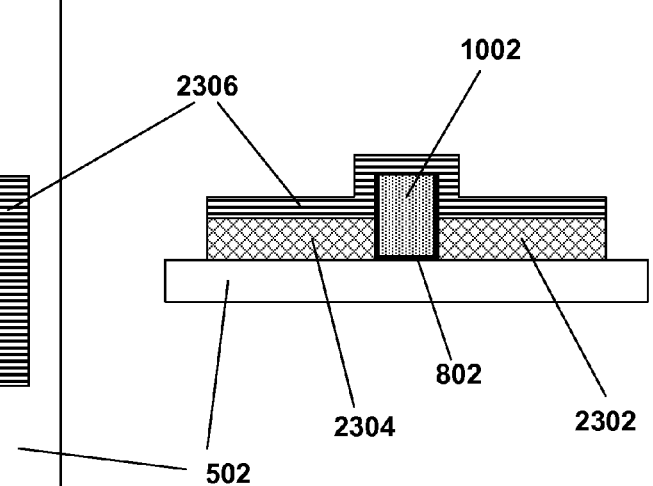

Referring to FIG. 24A and FIG. 24B, in general, the process illustrated by FIG. 13A and FIG. 13B through FIG. 17A and FIG. 17B may be utilized to arrive at the point illustrated by FIG. 24A and FIG. 24B. Mask is applied to a portion of wire layer 1102. The portion of wire layer 1102 not protected by mask is removed and remaining wire layer 1102 forms wire lead 2306. Mask is removed to expose surface of wire lead 2306. A portion of first contact layer 504 is removed as illustrated in FIGS. 15A and 15B through FIG. 17A and FIG. 17B. Remaining first contact layer 504 includes first contact member 2302 and second contact member 2304. As shown, wire lead 2306 is partially "wrapped" around at least a portion of writer pole 1002 and is in contact with surface of first contact member 2302 and second contact member 2304. Insulator film 802 determines distance between wire lead 2302 and writer pole member 1002 and contact members 2302, 2304 and writer pole member 1002. The thickness of second layer 1702, illustrated in FIG. 18A and FIG. 18B through FIG. 21A and FIG. 21B, determines the extent that wire lead 2306 is "wrapped" around writer pole 1002. For example, the portion of writer pole 1002 "wrapped" by wire lead 2306 is increased if the thickness of second layer 1702 is increased.

In another aspect, the present disclosure is related to an assembly including a housing, a rotatable data disc within the housing, and a magnetic recording head within the housing and adjacent to the data disc. The magnetic recording head includes a writer pole member; a first contact member adjacent to the writer pole member; a second contact member adjacent to the writer pole member, a wire lead adjacent to the writer pole member, and an insulator layer having a film thickness. The wire lead is in contact with the first contact member and the second contact member. The insulator layer is between the writer pole member and the first contact member. The insulator layer is between the writer pole member and the second contact member Embodiments of the present invention may provide for various advantages. For example, an insulator layer between a contact member and a writer pole member may allow contact member to be brought in close proximity to a writer pole member. Reducing the thickness of insulator later between contact members and writer pole member can reduce the distance between a writer pole member and adjacent contact members. In some embodiments, reducing the distance between a writer pole member and adjacent contact members may allow for the reduction in length of wire lead required to create an electromagnetic field. A reduction in length of wire lead may result in a relative reduction in the amount of heat generated by a magnetic recording head and also reduce the amount of power consumed by a magnetic recording head. Additionally, contact members of a magnetic recording head may also provide an effective heat transport path for heat generated by a wire.

Embodiments of the present may suitably comprise, consist of, or consist essentially of, the elements disclosed herein. Embodiments of the present invention illustratively disclosed herein suitable may be practiced in the absence of any element which is not specifically disclosed herein.

The implementations described above and other implementations are within the scope of the following claims.

What is claimed is:

1. A method comprising:
   depositing an insulator material onto at least a portion of a first member, wherein the insulator material forms an insulator film having a film thickness; and
   depositing a writer pole material onto the insulator film, wherein the writer pole material forms a writer pole member, wherein the insulator film is between the writer pole member and a contact layer, wherein the contact layer comprises at least one of copper, gold or tantalum.

2. The method of claim 1, wherein the first member comprises a substrate having at least one major surface; and the contact layer defines a boundary of a writer pole imprint on a portion of the major surface.

3. The method of claim 1, wherein the insulator material comprises at least one of aluminum nitride, silicon nitride, aluminum oxide, silicon oxide or diamond like carbon.

4. The method of claim 1, wherein the insulator material is deposited by atomic layer deposition.

5. The method of claim 1, wherein the film thickness determines a distance between the writer pole member and the contact layer.

6. The method of claim 1, wherein the film thickness is about 5 angstroms to about 2 micrometers.

7. The method of claim 6, wherein the film thickness is less than about 1 micrometer.

8. The method of claim 1, further comprising depositing a wire material such that the wire material forms a wire layer, wherein the wire layer is in contact with the contact layer and adjacent to the writer pole member.

9. The method of claim 8, wherein the wire layer is partially wrapped around at least a portion of the writer pole member.

10. The method of claim 8, wherein the wire material is at least one of tungsten, tantalum, copper or gold.

11. The method of claim 1, wherein the contact layer includes a first contact member and a second contact member.

12. The method of claim 11, further comprising forming a wire lead, wherein that the wire lead is configured to carry electrical current between the first and second contact member, such that the current induces a magnetic flux into the writer pole member.

13. The method of claim 12, wherein the wire lead is partially wrapped around at least a portion of the writer pole member.

14. The method of claim 1, wherein the first member comprises a substrate and the substrate is a solid wafer.

* * * * *